(12) United States Patent
Reznek et al.

(10) Patent No.: US 6,500,401 B2
(45) Date of Patent: Dec. 31, 2002

(54) CARBON FOAMS AND METHODS OF MAKING THE SAME

(75) Inventors: Steven R. Reznek, Concord, MA (US); Robert K. Massey, West Newbory, MA (US)

(73) Assignee: Cabot Corporation, Boxton, MA (US)

( * ) Notice: Subject to any disclaimer, the term of this patent is extended or adjusted under 35 U.S.C. 154(b) by 71 days.

(21) Appl. No.: 09/805,264

(22) Filed: Mar. 13, 2001

(65) Prior Publication Data

US 2002/0028385 A1 Mar. 7, 2002

Related U.S. Application Data

(60) Provisional application No. 60/220,464, filed on Jul. 20, 2000.

(51) Int. Cl.[7] ............................................... C01B 31/00
(52) U.S. Cl. ..................... 423/445 R; 423/447.2; 423/447.4; 423/447.8; 423/447.9; 423/449.2; 423/460; 252/502; 252/519.32; 252/519.33; 429/44; 429/231.8; 429/247; 429/249; 204/283; 204/294; 361/502; 361/522; 361/523; 361/524; 361/528; 361/532; 502/101; 502/418; 502/420; 502/432; 521/27; 521/61; 521/64; 521/181
(58) Field of Search ............................ 252/502, 519.32, 252/519.33; 429/44, 231.8, 247, 249; 423/445 R, 447.2, 447.4, 447.8, 447.9, 449.2, 460; 204/294, 283; 361/502, 522, 523, 524, 528, 532; 521/27, 61, 64, 181; 502/418, 420, 432, 101

(56) References Cited

U.S. PATENT DOCUMENTS

| | | | |
|---|---|---|---|
| 4,756,898 A | | 7/1988 | Hopper et al. ............... 423/449 |
| 5,260,855 A | * | 11/1993 | Kaschmitter et al. ........ 361/502 |
| 5,300,272 A | | 4/1994 | Simandl et al. .......... 423/445 R |
| 5,328,501 A | | 7/1994 | McCormick et al. .......... 75/352 |
| 5,358,802 A | * | 10/1994 | Mayer et al. ................. 423/445 |
| 5,402,306 A | * | 3/1995 | Mayer et al. ................ 361/502 |
| 5,476,878 A | * | 12/1995 | Pekala .......................... 521/61 |
| 5,510,212 A | * | 4/1996 | Delnick et al. .............. 429/218 |
| 5,554,739 A | | 9/1996 | Belmont et al. ............. 534/885 |
| 5,556,892 A | * | 9/1996 | Pekala ......................... 521/181 |
| 5,571,311 A | | 11/1996 | Belmont et al. ............... 106/20 |
| 5,626,977 A | * | 5/1997 | Mayer et al. .................. 429/44 |
| 5,630,868 A | | 5/1997 | Belmont et al. .......... 106/31.75 |
| 5,672,198 A | | 9/1997 | Belmont .................... 106/20 R |
| 5,698,016 A | | 12/1997 | Adams et al. ............... 106/316 |
| 5,707,432 A | | 1/1998 | Adams et al. .............. 106/31.6 |
| 5,713,988 A | | 2/1998 | Belmont et al. ............ 106/31.6 |
| 5,789,338 A | * | 8/1998 | Kaschmitter et al. ........ 502/418 |
| 5,803,959 A | | 9/1998 | Johnson et al. ........... 106/31.75 |
| 5,837,045 A | | 11/1998 | Johnson et al. ........... 106/31.85 |
| 5,851,280 A | | 12/1998 | Belmont et al. ............. 106/472 |
| 5,885,335 A | | 3/1999 | Adams et al. ............... 106/316 |
| 5,895,522 A | | 4/1999 | Belmont et al. ............ 106/31.6 |
| 5,900,029 A | | 5/1999 | Belmont et al. ............... 8/550 |
| 5,945,084 A | * | 8/1999 | Droege ...................... 423/447.4 |
| 5,993,996 A | * | 11/1999 | Firsich ..................... 429/231.8 |
| 6,033,506 A | | 3/2000 | Klett ............................ 156/78 |
| 6,217,841 B1 | * | 4/2001 | Grindatto et al. ........... 423/345 |
| 6,332,990 B1 | * | 12/2001 | Mayer et al. ................ 252/502 |
| 6,361,666 B1 | * | 3/2002 | Lipinski et al. ............. 204/283 |

FOREIGN PATENT DOCUMENTS

| | | |
|---|---|---|
| CA | 2330443 | 8/1996 |
| WO | WO 96/18688 | 6/1996 |
| WO | WO 97 47697 | 12/1997 |
| WO | WO 97/47699 | 12/1997 |

OTHER PUBLICATIONS

Copy of International Search Report for PCT/US01/20585 dated Jan. 30, 2002.

* cited by examiner

*Primary Examiner*—Bruce F. Bell

(57) ABSTRACT

A method of making carbon foam is described which involves pyrolizing a mixture containing at least one pyrolizable substance and at least one unpyrolizable material and then removing the unpyrolizable material to obtain the carbon foam. Carbon foam made by this process is also described. Incorporating the carbon foam in a variety of end use applications including electrodes, thermal insulation material, polymers, and the like is also described.

39 Claims, 3 Drawing Sheets

CARBON FOAMS AND METHODS OF MAKING THE SAME

CROSS REFERENCE TO RELATED APPLICATION

This application claims the benefit under 35 U.S.C. §119 (e) of prior U.S. Provisional Patent Application No. 60/220,464 filed Jul. 20, 2000, which is incorporated in its entirety by reference herein.

BACKGROUND OF THE INVENTION

The present invention relates to carbon foams and methods of making carbon foams as well as their use in a variety of products, such as insulation materials and capacitors.

Carbon aerogels have been used in a wide variety of applications, including thermal insulation, conducting fillers for polymers or plastics, electrodes, and electrochemical cells. Carbon aerogels which have high surface areas and high DBP values are desirable in many of these and other applications.

Various methods are known to make carbon aerogels including using pitch, using organic gels with a catalyst and reacting the mixture, using sol-gel polymerization to form highly cross linked networks of high surface area foam and dissolving a polyacrylonitrile in a heated solution with at least one alkali metal halide in a solvent to eventually form a liquid gel. The liquid gel is then heated wherein the solvent is removed along with the dissolved alkali metal halide to provide a porous form consisting essentially of polyacrylonitrile wherein the porous form is then cured at elevated temperatures to carbonize the polyacrylonitrile to form the carbon foam.

While such methods are useful, there is always a desire in the industry to develop other less expensive methods of making carbon foams which preferably lead to greater flexibility in making foams having higher surface areas as well as high structure.

SUMMARY OF THE PRESENT INVENTION

A feature of the present invention is to provide carbon foams.

Another feature of the present invention is to provide carbon foams preferably having high surface areas as well as high structure.

An additional feature of the present invention is to provide methods of making carbon foams.

Still, another feature of the present invention is to incorporate the carbon foams into such applications as thermal insulation, elastomer or plastic reinforcement, conducting fillers, electrodes, and the like.

Additional features and advantages of the present invention will be set forth in part in the description which follows, and in part will be apparent from the description, or may be learned by practice of the present invention. The objectives and other advantages of the present invention will be realized and obtained by means of the elements and combinations particularly pointed out in the written description and appended claims.

To achieve these and other advantages, and in accordance with the purposes of the present invention, as embodied and broadly described herein, the present invention relates to a method of making carbon foam which involves pyrolyzing a mixture which contains at least one pyrolizable substance and at least one unpyrolizable material and then removing the unpyrolizable material to obtain the carbon foam.

The present invention further relates to carbon foam made by the above-described method.

The present invention further relates to carbon foam having cells bordered by thin sheets or windows and/or struts. The foam particles are typically about 5 to about 30 microns across and the cells are from about 0.5 and to about 3 microns across. Typically the cells are not closed, but have openings between them. Because the foam can be rigid, pieces of the foam can be broken off, and the material can contain both the foam particles and their fragments.

It is to be understood that both the foregoing general description and the following detailed description are exemplary and explanatory only and are intended to provide a further explanation of the present invention, as claimed.

DETAILED DESCRIPTION OF THE PRESENT INVENTION

Figure 1:
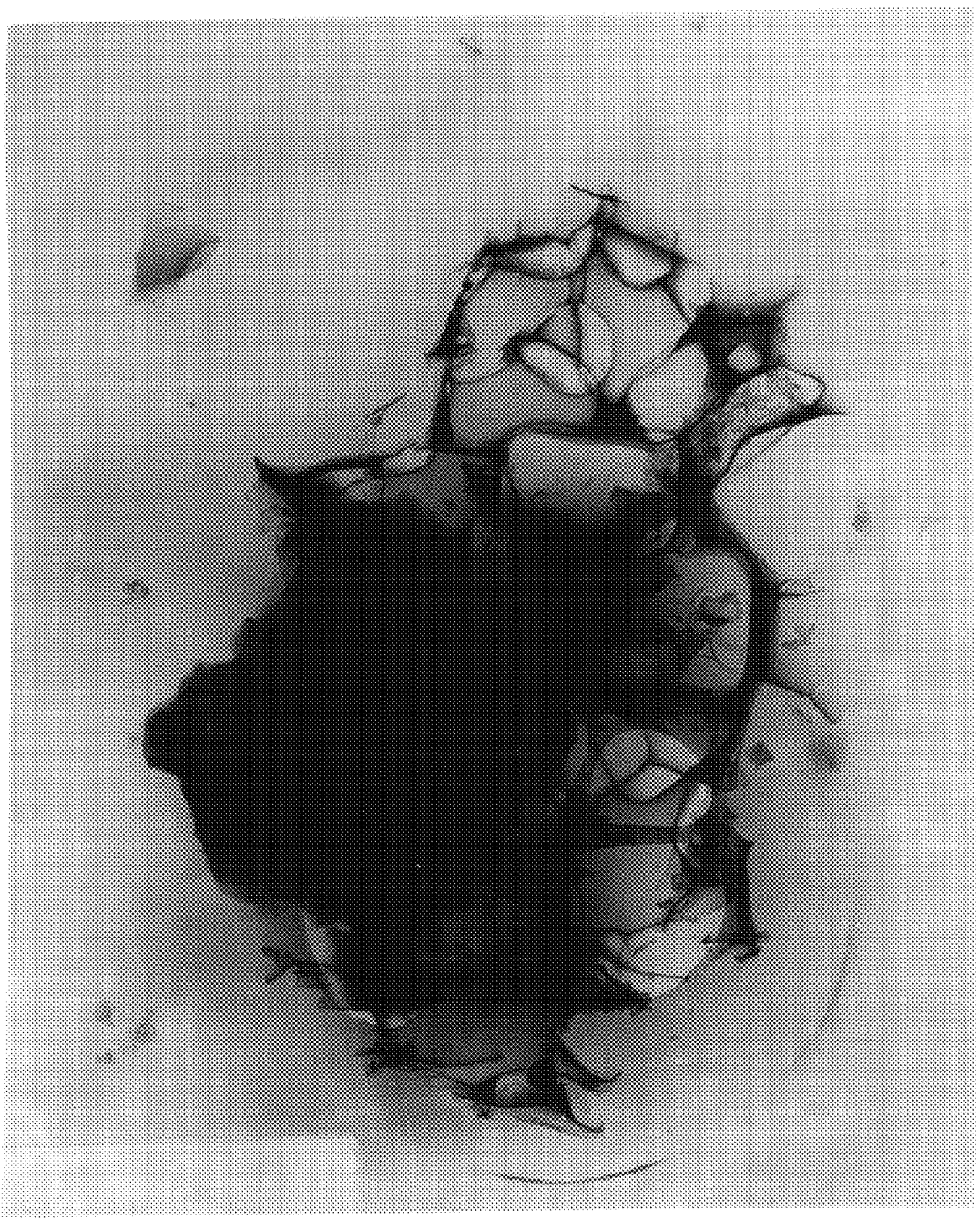
FIG. 1 is a transmission electron photomicrograph of one type of carbon foam particles of the present invention.

The present invention relates to carbon foams and methods of making these carbon foams. The present invention further relates to the use of these carbon foams in a variety of end-use applications.

The carbon foam of the present invention is preferably made by pyrolizing a mixture which contains at least one pyrolizable substance and at least one unpyrolizable material. Once the mixture has been pyrolized, the unpyrolizable material is then removed to obtain the carbon foam.

This carbon foam can then be used in its foam state or can be reduced into pieces to form particles which preferably are highly structured.

In more detail, and with reference to the above-described method, the pyrolizing substance is preferably an organic substance such as an organic compound. Examples include, but are not limited to, carbohydrates, coal, and hydrocarbons. Essentially, the substance used is a substance which will pyrolize instead of evaporate when heated. A preferred pyrolizable substance is sugar, cellulose compounds, coal, and the like. Other examples include, but are not limited to, hydrocarbons and polymers and derivatives thereof.

The unpyrolizable material is the opposite of the pyrolizable substance. In other words, the unpyrolizable material will not pyrolize when heated and instead will preferably maintain its state throughout the pyrolizing step. Preferably, the unpyrolizable material is an inorganic material such as a salt.

The pyrolizing step can occur at any temperature which will result in the pyrolizable substance to be pyrolized or at least partially pyrolized. A variety of properties can be exhibited by the carbon foam depending upon the degree of pyrolysis that occurs in the formation of the carbon foam. A low or incomplete pyrolysis generally leads to a carbon foam which is non-conductive and a material that is subjected to a full pyrolysis or nearly complete pyrolysis is generally electrically conductive. Further, the more complete the pyrolysis, generally the higher conductivity achieved in the carbon foam that is formed. Thus, with the present invention, the properties of the carbon foam can be "dialed in" to the desired properties based on controlling the degree of pyrolysis. As a further example, the pyrolysis temperature determines the chemical and physical composition of the pyrolized material. For example, if sugar is pyrolized at 350° C. to 400° C., the resulting material is brown and contains about two percent hydrogen. It is essentially non-conducting. If the sugar is heated to 700° C., the foam becomes black in color and electrically conducting and if further heated to 1100° C., the conductivity is further increased.

Examples of pyrolizing temperature ranges include, but are not limited to, from about 200° C. to about 1600° C., and more preferably from about 400° C. to about 1600° C. Certainly, other temperature ranges are possible depending upon the type of pyrolizable substance used. Once the pyrolizable substance is determined, determining the necessary pyrolizing temperature is within the ability of one skilled in the art in view of the present application and routine experimentation.

The mixture which contains at least one pyrolizable substance and at least one unpyrolizable material is preferably a fine dispersion. The mixture can be achieved by using conventional mixing devices to mix the pyrolizable substance with the unpyrolizable substance. Preferably, the mixture is a uniform mixture of the pyrolizable substance with the unpyrolizable substance in order to achieve a uniform foam. The mixture can be prepared by milling the pyrolizable substance with the unpyrolizable substance using standard milling techniques. For instance, high intensity milling can be used such as with a ball mill. A shot or sand mill can be used as well.

The mixing can also be accomplished by using the mechanical and/or chemical techniques described in Canadian Published Patent Application No. CA 2,230,443 and U.S. Pat. No. 5,328,501, both incorporated in their entirety by reference herein, such as high energy milling and the like.

Alternatively, the mixing can be obtained by dissolving the pyrolizable substance and the unpyrolizable material in a solvent capable of dissolving the two materials. Once the mixture is dissolved in one or more solvents, the solution can then be precipitated so as to remove the solvent and form a finely dispersed mixture. This method can be achieved by atomizing the solution containing the dissolved pyrolizable substance and the unpyrolizable material and permitting the droplets to dry.

Another method of preparing the mixture can involve mixing a fluid with the pyrolizable substance and the unpyrolizable material to make a paste or dough-like material. This dough or paste can then be milled in an internal mixer such as a Banbury mixer or other device that would provide a uniform mixture of the two ingredients. Other techniques to mix the pyrolizable substance with the unpyrolizable material can be used.

Once the mixture is obtained, the mixture can be pyrolized as described above. The pyrolizing can take place using any conventional device that achieves the necessary temperatures to achieve a pyrolizing mixture. Such devices include, but are not limited to, rotary and fixed bed kilns.

After pyrolizing the mixture, the unpyrolizable material which did not pyrolize due to its nature can then be removed. The removing of such a material can be achieved by any technique such as dissolving the unpyrolizable material. Alternatively, the unpyrolizable material can be evaporated away or melted away, or can be removed by subliming the unpyrolizable material. Once the unpyrolizable material is removed, a carbon foam having a network of carbon formed cells is achieved.

The carbon foam formed by the present invention preferably has carbon foam having cells bordered by thin sheets, windows, and/or struts. The foam particles are typically from about 5 to about 30 microns across and the cells have a thickness of from about 0.5 to about 3 microns. Typically the cells are not closed, but have openings between them. The foam can be rigid, and pieces can be broken off. Thus, the material can contain both the foam particles and their fragments.

In one embodiment, the carbon foam of the present invention preferably has a BET surface area of from about 100 to about 500 $m^2/g$, and more preferably from about 270 to about 350 $m^2/g$. Other carbon foams of the present invention can have other BET surface areas depending upon the staring material used to form the carbon foam and the degree of pyrolysis. The carbon foam can also have a DBP adsorption of from about 100 cc/100 g to about 500 cc/100 g. The carbon foam can have other DBP adsorptions, again, depending upon the starting material used to form the carbon foam as well as the degree of pyrolysis. The carbon foam of the present invention preferably has walls or windows which is different from aerogels which only have very small struts. In the carbon foams of the present invention, the windows are preferably anchored to struts.

The carbon foam of the present invention can be subsequently chemically modified or surface treated using a variety of techniques such as the attachment of organic groups onto the surface of the carbon foam. Such techniques and groups include, but are not limited to, these described U.S. Pat. Nos. 5,900,029; 5,895,522; 5,885,335; 5,851,280; 5,837,045; 5,803,959; 5,672,198; 5,571,311; 5,630,868; 5,707,432; 5,803,959; 5,554,739; 5,698,016; 5,713,988; WO 96/18688; WO 97/47697; WO 97/47699, and U.S. patent application Ser. Nos. 09/317,287; 60/116,500; 60/135,558; 60/163,716; and 60/163,857; where all are incorporated herein in their entireties by reference.

Preferably, the unpyrolizable material is dissolvable by water and thus would lead to a step which would be economical and easy for purposes of removing the unpyrolizable material. For instance, if the unpyrolizable material is a salt, the removal by water is generally achievable.

The carbon foam, once formed, can be used as any other conventional carbon foam. For instance, the carbon foam can be used in a manner as described in U.S. Pat. Nos. 5,300,272; 6,033,506; 5,945,084; and 5,476,878, all incorporated in their entireties by reference herein.

The carbon foam can, if desired, be reduced to fragments and/or particles. The reduction of the carbon foam can be achieved by any technique such as grinding the carbon foam into highly structured particles and/or fragments. The grounded carbon foam can be used as filler or any other use for carbon based particles.

As indicated above, the carbon foams can be used in a wide variety of applications, including thermal insulation, polymers, elastomers, capacitors, battery electrodes, fuel cells, electrodes in electrochemical cells or supercapacitors, and the like. The carbon foams or fragments thereof can also be used as conducting fillers in polymers or reinforcing fillers in elastomers. The manner and amount of the carbon foam used in each of these applications would be conventional and known to those skilled in the art in view of the present application and the conventional technology of using carbon foam in these applications.

The present invention will be further clarified by the following examples, which are intended to be purely exemplary of the present invention.

BET surface areas were measured using ASTM Vol. 09.01, METHOD D 4820 and DBP was measured using ASTM Vol. 09.01, METHOD D2414.

EXAMPLES

Example 1

In this Example, sugar was used as the pyrolizable substance and sodium chloride was used as the unpyrolizable material. Using a weight ratio of salt to sugar of either 10:1 or 5:1, the ingredients were mixed together in a shot mill. The mixture was milled for 30 minutes.

In a second set of experiments, the same ratios of salt and sugar were dissolved in water and then sprayed dried.

Both the milled and spray dried mixtures were calcined initially at 350 to 400° C. for 30 minutes. This temperature proved to be sufficient to cause partial pyrolisis of the sugar. The calcination was done in an inert atmosphere of nitrogen.

In each instance, the pyrolized mixture was then washed with water to remove the salt and leave the pyrolized sugar remaining. The material was then further calcined in a nitrogen atmosphere at two different temperatures, 700° C. and 1100° C. for 30 minutes.

Figure 2:
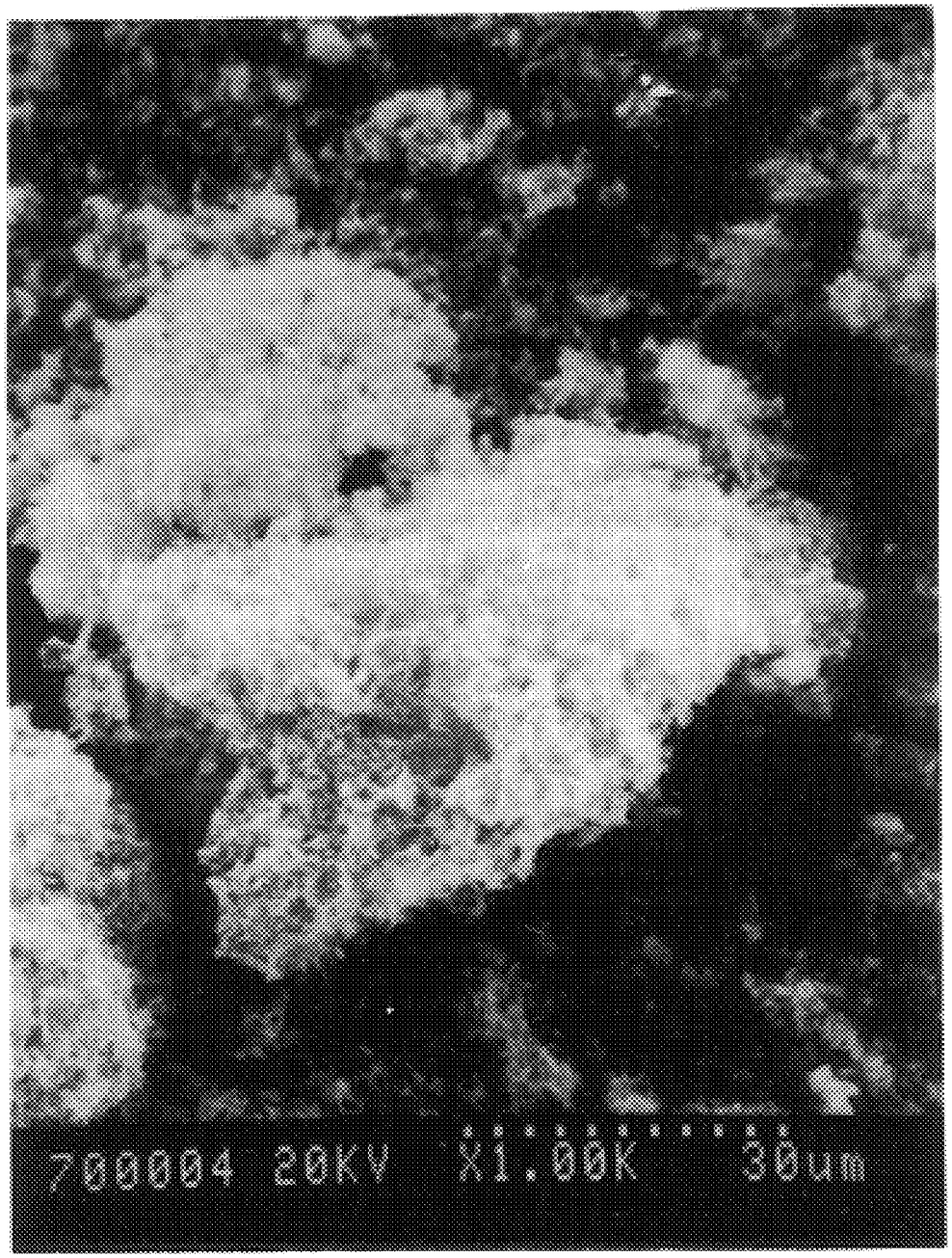
FIGS. 2 and 3 are scanning electron photomicrographs of carbon foam particles of the present invention.
Figure 3:
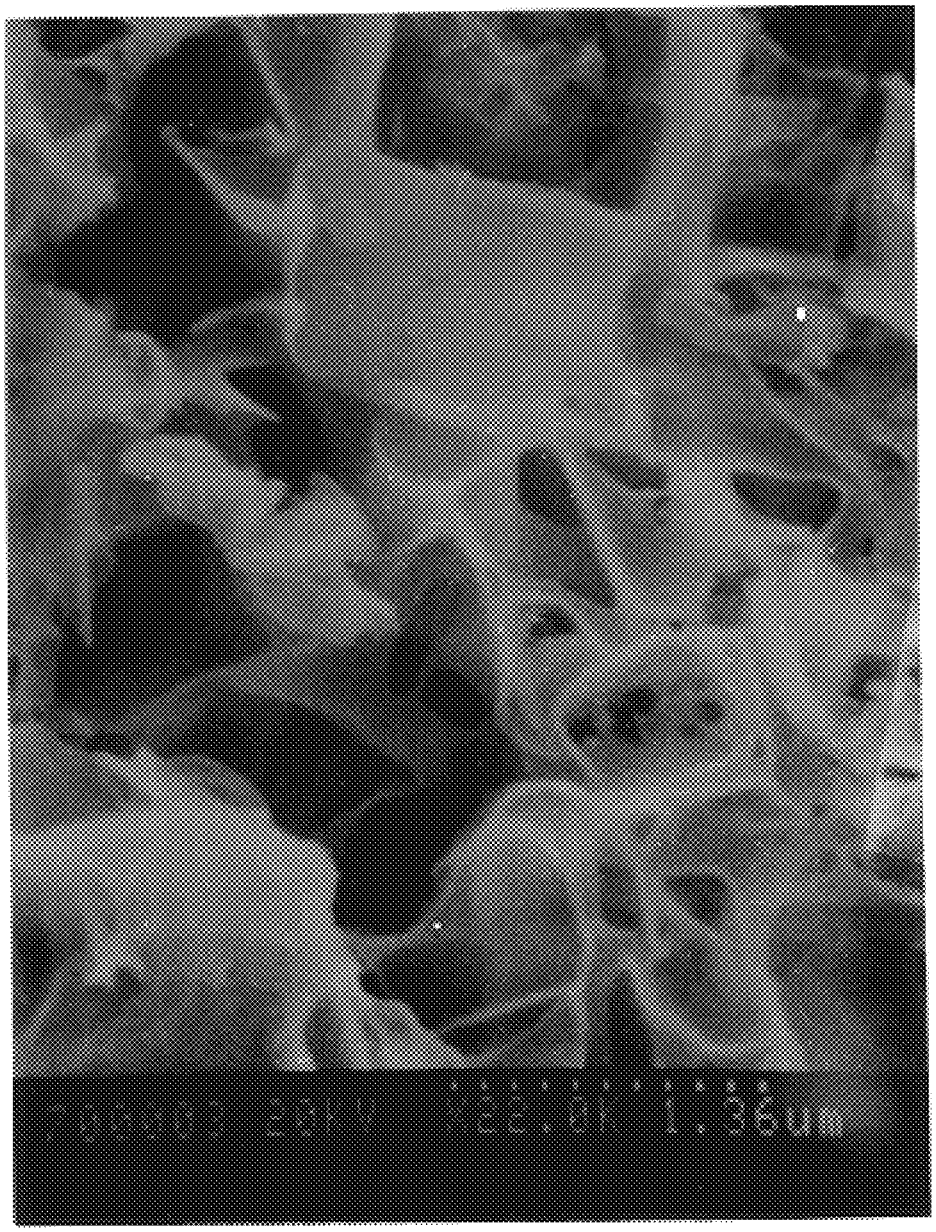

The surface area and DBP of the resulting carbon foams were measured. The BET surface area of the resulting carbon foams was between 270 and 290 square meters per gram and the DBP absorption was 370 cc's per 100 grams. Furthermore FIG. 1 sets forth a transmission electron photomicrograph and FIGS. 2 and 3 are scanning electron photomicrographs of some of these particles that were calcined at 1100° C. at the magnifications indicated on the photomicrographs.

Example 2

Salt and coal were ground together in a Szegvari attritor using 500 g of 3/16" stainless shot and 500 g of 3/8" ceramic beads for 30 minutes at the highest speed set point. 100 g of salt and either 20 g or 10 g of coal were used in the attritor to form 5:1 or 10:1 weight ratios of salt to coal. The particle size distribution as a result of milling was from about 1 to 40 microns. The mean particle size was about 6 microns. The ground salt and coal samples were then heated in a tube furnace from room temperature to 700° C. in 30 minutes and then subsequently held for 1 hour at 700° C. under a nitrogen atmosphere. The samples were then washed in 1 liter of water and vacuumed filtered through a 6 micron filter to remove any salt. This was done twice. The samples were then dried at 120° C. BET surface areas were then measured using ASTM Volume 09.01, METHOD D4820.

| Sample # | Description | BET Surface Area ($M^2$/gCB) |
| --- | --- | --- |
| 1 | coal only | 1.5 |
| 2 | 5:1 salt/coal | 82.7 |
| 3 | 10:1 salt/coal | 236.1 |

The samples were then flashed heated by heating the tube furnace to 700° C. and then pulling the samples into the furnace using a stainless steel wire attached to the boat.

| Sample # | Description | BET Surface Area ($M^2$/gCB) |
| --- | --- | --- |
| 4 | coal only | 2.2 |
| 5 | 5:1 salt/coal | 165 |
| 6 | 10:1 salt/coal | 280 |

As can be seen from the samples, the use of salt significantly increased the surface area. Rapid heating further increased the surface area.

The carbon foam formed in these examples was acceptable for use in various end use applications, such as in polymer compounds, thermal insulating materials, electrodes, capacitors, and the like. The carbon foam can be used in lieu of conventional fillers, pigments, or particles that are used in such end use applications.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method of making carbon foam comprising pyrolizing a mixture comprising at least one pyrolizable substance and at least one unpyrolizable material; and after pyrolisis,
   removing said unpyrolizable material to obtain said carbon foam.

2. The method of claim 1, further comprising grinding said carbon foam into particles.

3. The method of claim 1, wherein said pyrolizable substance is an organic compound.

4. The method of claim 1, wherein said pyrolizable substance comprises at least one carbohydrate.

5. The method of claim 1, wherein said pyrolizable substance is sugar or cellulose.

6. The method of claim 1, wherein said pyrolizable substance comprises at least one hydrocarbon containing material.

7. The method of claim 1, wherein said pyrolizable substance comprises coal.

8. The method of claim 1, wherein said unpyrolizable material is an inorganic material.

9. The method of claim 1, wherein said unpyrolizable material is a salt.

10. The method of claim 1, wherein said pyrolizing occurs at a temperature of from about 300° C. to about 1600° C.

11. The method of claim 1, wherein said mixture is rapidly heated.

12. The method of claim 1, wherein said mixture is a fine dispersion.

13. The method of claim 1, wherein said mixture is obtained by milling said pyrolizable substance and unpyrolizable material.

14. The method of claim 1, wherein said mixture is obtained by dissolving at least one pyrolizable substance with at least one unpyrolizable material in a solvent and then precipitating the pyrolizable substance and unpyrolizable material from said solvent.

15. The method of claim 1, wherein said removing of the unpyrolizable material is accomplished by dissolving the unpyrolizable material.

16. The method of claim 1, wherein said removing of the unpyrolizable material is accomplished by evaporation, by melting, by subliming, or combinations thereof.

17. Carbon foam formed by the method of claim 1.

18. The carbon foam of claim 17, wherein said carbon foam particles are from about 5 to about 30 microns in diameter and said cells are from about 0.5 to about 3 microns in diameter.

19. The carbon foam of claim 17, wherein said cells have openings between them.

20. The carbon foam of claim 17, wherein said carbon foam is rigid.

21. A thermal insulating material comprising the carbon foam of claim 17 and/or fragments thereof.

22. A polymer compound comprising the carbon foam of claim 17 and/or fragments thereof.

23. An elastomer compound comprising the carbon foam of claim 17 and/or fragments thereof.

24. An electrode comprising the carbon foam of claim 17.

25. A capacitor electrode comprising the carbon foam of claim 17.

26. A battery electrode comprising the carbon foam of claim 17.

27. A fuel cell electrode comprising the carbon foam of claim 17.

28. A carbon foam having cells bordered by thin sheets, windows, struts, or combinations thereof, wherein said carbon foam has a BET surface area of from about 100 to about 500 $m^2/g$.

29. The carbon foam of claim 28, wherein said carbon foam has a DBP absorption of from about 100 cc/100 g to about 500 cc/100 g.

30. The carbon foam of claim 28, wherein said carbon foam particles are from about 5 to about 30 microns in diameter and said cells are from about 0.5 to about 3 microns in diameter.

31. The carbon foam of claim 28, wherein said cells have openings between them.

32. The carbon foam of claim 28, wherein said carbon foam is rigid.

33. A thermal insulating material comprising the carbon foam of claim 28 and/or fragments thereof.

34. A polymer compound comprising the carbon foam of claim 28 and/or fragments thereof.

35. An elastomer compound comprising the carbon foam of claim 28 and/or fragments thereof.

36. An electrode comprising the carbon foam of claim 28.

37. A capacitor electrode comprising the carbon foam of claim 28.

38. A battery electrode comprising the carbon foam of claim 28.

39. A fuel cell electrode comprising the carbon foam of claim 28.

* * * * *